United States Patent
Nourry et al.

[11] Patent Number: 5,716,035
[45] Date of Patent: Feb. 10, 1998

[54] CHANNEL SUPPORT DEVICE

[75] Inventors: Daniel Nourry, Dijon; Gérard Jego, Brazey en Plaine; Jean-Pierre Thierry, Arc-sur-Tille, all of France

[73] Assignee: Schneider Electric SA, Boulogne Billancourt, France

[21] Appl. No.: 451,985

[22] Filed: May 26, 1995

[30] Foreign Application Priority Data

Jun. 9, 1994 [FR] France .................. 94 07166

[51] Int. Cl.⁶ .................................. A47G 1/10
[52] U.S. Cl. ............ 248/316.5; 248/68.1; 248/229.11; 24/517
[58] Field of Search ............ 248/229.11, 229.23, 248/231.51, 67.7, 72, 58, 49, 68.1, 229.13, 316.5; 24/517, 519

[56] References Cited

U.S. PATENT DOCUMENTS

| | | | |
|---|---|---|---|
| 526,798 | 10/1894 | Wise | 248/231.51 |
| 554,461 | 2/1896 | Schrantz | 24/517 |
| 831,627 | 9/1906 | Pickens | 248/229.13 |
| 2,829,190 | 4/1958 | Comlossy | 248/49 |
| 3,809,799 | 5/1974 | Taylor . | |
| 4,618,114 | 10/1986 | McFarland | 248/68.1 |
| 4,769,985 | 9/1988 | Moritz | 248/49 |
| 5,109,580 | 5/1992 | Camus | 24/458 |
| 5,305,978 | 4/1994 | Current | 248/230 |
| 5,354,030 | 10/1994 | Harwood | 248/231.51 |
| 5,570,500 | 11/1996 | Merkel | 24/515 |

FOREIGN PATENT DOCUMENTS

| | | | |
|---|---|---|---|
| 21119 | 6/1914 | France | 248/72 |
| 3575510 | 8/1922 | Germany | 24/517 |
| 1194478 | 7/1970 | United Kingdom . | |

*Primary Examiner*—Ramon O. Ramirez
*Assistant Examiner*—Gwendolyn W. Baxter
*Attorney, Agent, or Firm*—Oblon, Spivak, McClelland, Maier & Neustadt, P.C.

[57] ABSTRACT

A channel supporting device includes a support member having two clamps between which trunking is accommodated. The clamps each have an upper projection which defines between them and above the trunking housing for receiving a channel. The channel locks the support member around the trunking.

6 Claims, 2 Drawing Sheets

CHANNEL SUPPORT DEVICE

The present invention concerns a device for supporting a channel associated with prefabricated electrical trunking. The device includes a support member with clamps between which the trunking is accommodated.

Power distribution systems inside buildings usually comprise electrical trunking containing the conductors and suspended from a support such as a ceiling by suspension members. Electrical devices such as lamps can then be suspended from and connected to the trunking. It is sometimes necessary to add further wires or cables to the installation at a later time. These are usually accommodated in a channel suspended from the trunking. This device below the trunking prevents suspension of electrical devices from it, however.

The present invention remedies this drawback by means of a support device which holds a channel adapted to accommodate additional wires on top of the trunking in a simple manner.

The device includes a support member provided with clamps which are articulated and assembled to each other by assembly and pivot means and each comprise a web and a flange. The device is characterised in that the clamps provide between them and on top of the trunking a housing adapted to receive the channel and comprise holding projections at the top to retain the channel in the transverse direction.

The clamps are part of a flat member stamped from sheet metal. The member of the invention is of low cost, easy to fit around the trunking because of its small size and adapted to be attached to the members from which the trunking is suspended.

The flanges of the clamps are assembled together and the housing is formed between the holding projections and the outside edges of the assembled flanges.

Each holding projection has a recess which can accommodate a rib formed on the lateral walls of the U-shape channel.

Finally, the flanges have respective lateral bearing lugs adapted to bear on the top wall of the trunking to hold the support member in equilibrium in a plane perpendicular to the longitudinal axis of the trunking.

The following description with reference to the drawings indicates the features and advantages of the invention.

Figure 1:
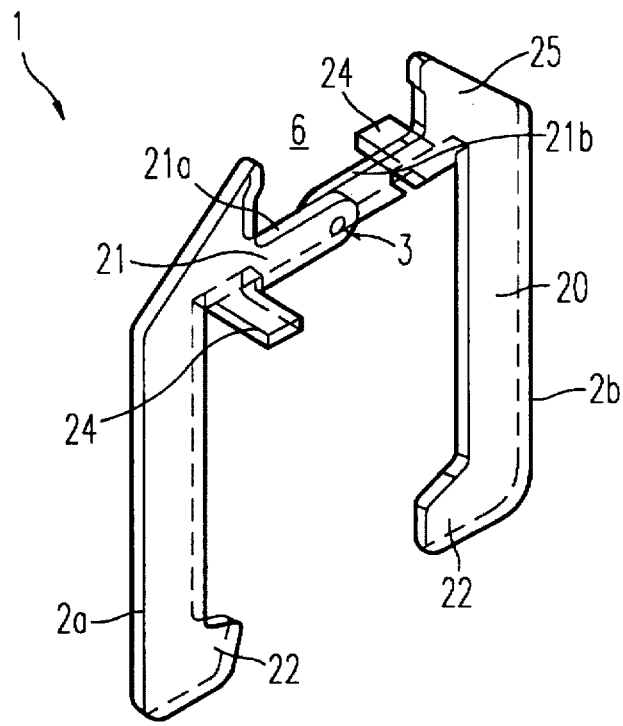
FIG. 1 is a perspective view of the support member of the invention.
Figure 2:
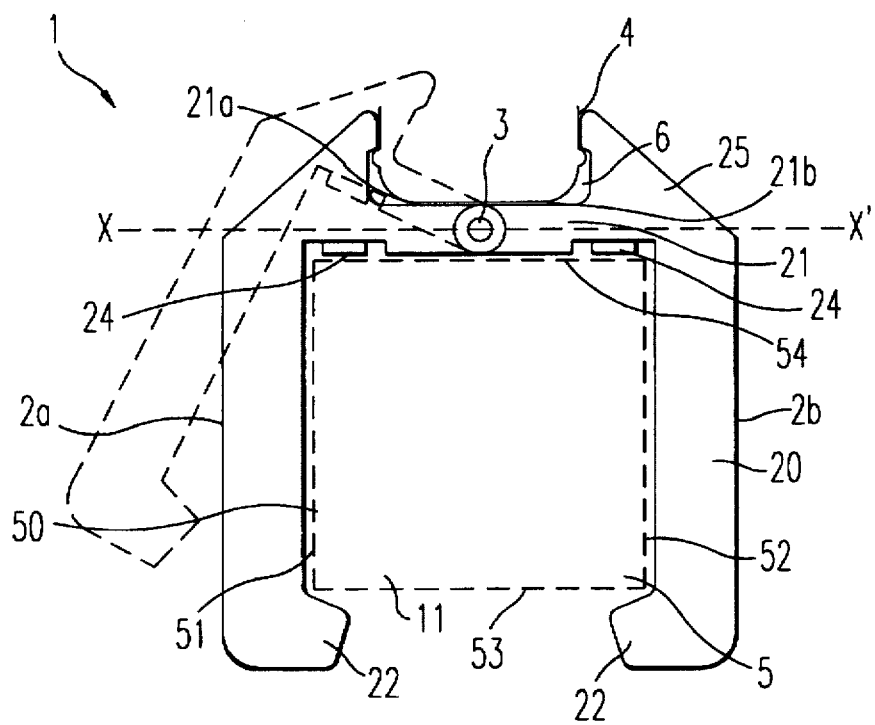
FIG. 2 is an elevation view of the support member in conjunction with the channel.
Figure 3:
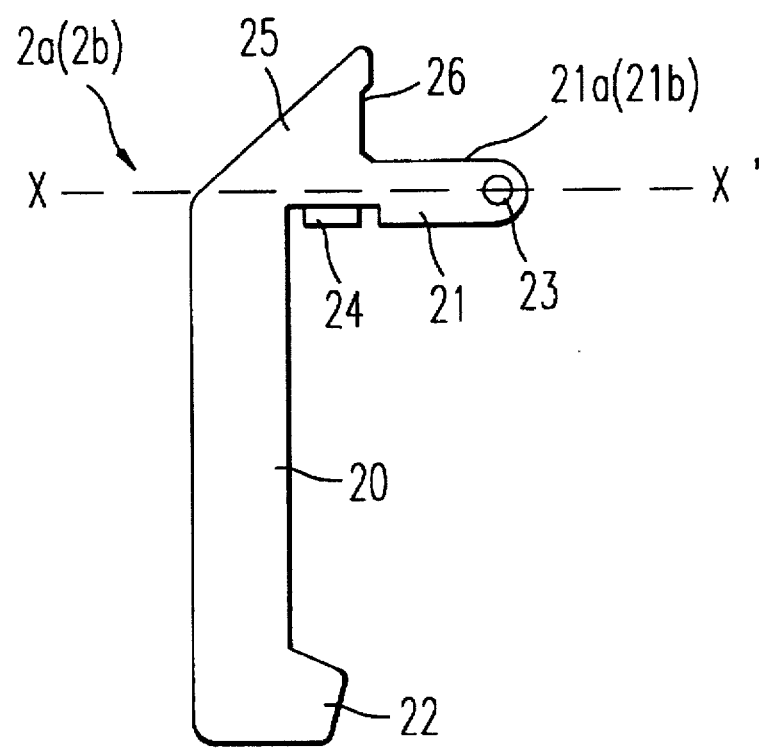
FIG. 3 is an elevation view of one clamp of the support member.
Figure 4:
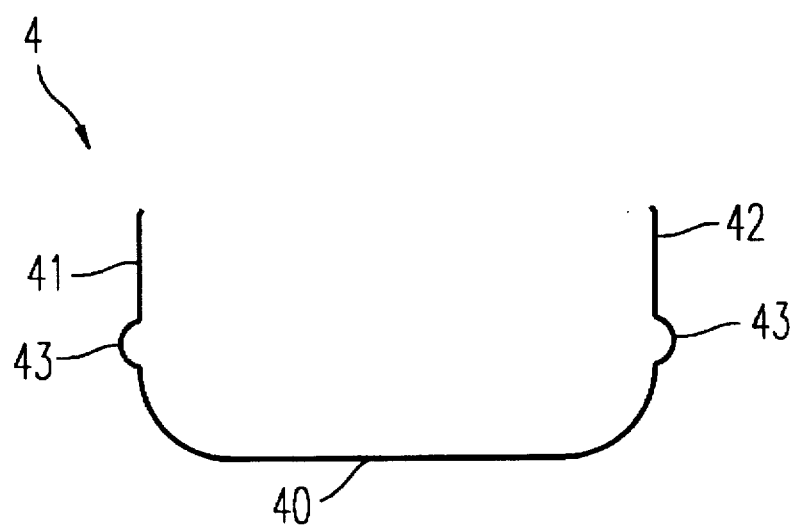
FIG. 4 is an elevation view of the channel.

The support member 1 (FIGS. 1 and 2) is a flat member stamped from sheet metal. It is designed to be fixed around prefabricated electrical trunking 5 comprising a parallelepiped-shape metal enclosure 50 with four walls: side walls 51, 52, bottom wall 53 and top wall 54 and having longitudinal axis 11 (perpendicular to the plane of FIG. 2).

The support member 1 is flat and stirrup-shape, comprising two identical symmetrical L-shape clamps 2a and 2b fixed and articulated together by assembly and pivot means 3.

Each clamp has a web 20 and a flange 21 the narrow edges of which are adapted to bear against the side wall 51 or 52 and against the top wall 54 of the trunking, respectively. The web 20 has at its free end an attachment lug 22 adapted to press against the underside of the bottom wall 53.

The flange 21 has a hole 23 at its free end, a bearing lug 24 bent to the side and adapted to bear against the top wall 54 and a holding projection 25 at the top, in alignment with the web 20 and above the flange 21. The projection 25 is adapted to hold a channel 4 parallel to the top wall 54.

The respective holes 23 in the clamps 2a and 2b cooperate with the assembly and pivot means 3 which preferably comprise a rivet which assembles the clamps together and articulates them about an axis perpendicular to the longitudinal axis XX' of the flanges 21. The clamps are not locked until the member has been fitted around the trunking and the channel has been fixed to the support member.

The respective lugs 24 of the clamps 2a and 2b projecting perpendicularly to the axis XX' and parallel to the plane of the top wall of the trunking bear on the top wall 54 and face in opposite directions in order to hold the member 1 in equilibrium in a plane perpendicular to the longitudinal axis of the trunking until it is locked around the trunking.

The holding lug 25 has a recess 26 in its inside edge. The respective holding projections 25 of the clamps 2a and 2b face each other and define with the outside edges 21a and 21b of the flanges 21 a housing 6 which accommodates the channel 4 when the member 1 is fitted around the trunking, the recesses 26 holding the channel 4.

The channel 4 is bent to a U-shape from sheet metal and has a bottom wall 40 adapted to rest on the outside edges 21a and 21b of the flanges 21 and side walls 41 and 42 which have a longitudinal rib 43 on their outside face adapted to fit in the recess 26 to hold the channel 4 in the housing 6.

The operation of the device of the invention will now be described.

As the support member 1 is not lockable on its own, the clamps can easily be separated to open the stirrup; the support member is placed over the trunking so that the latter is between the clamps 2a and 2b; the bearing lugs 24 on the inside edges of the flanges, i.e. the edges opposite the edges 21a and 21b, rest on the top wall of the trunking. The clamps are then pivoted against the trunking so that the support member embraces the side walls 51 and 52 and the attachment lugs 22 bear against the wall 53.

A plurality of support members are fitted to the trunking in this way, held in equilibrium by the bearing lugs 24. The channel is then located and retained in a cable path established by the housings 6 between the support projections 25, the ribs 43 on the side walls clipping into the recesses 26 on the Projections. This clipping engagement with the channel prevents the clamps opening and in this way locks the support member around the trunking.

We claim:

1. Channel supporting device including a support member, comprising:

clamps between which trunking is accommodated, said clamps being articulated and assembled together by a fastening and pivot means;

each of said clamps being formed of a web, a flange and a projection on an upper part and each being part of a flat member stamped from sheet metal;

the flanges of the clamps being assembled together;

a housing being defined between said projections and top edges of the assembled flanges;

said housing receiving a channel which is a support for electric wires and locks the support member around the trunking.

2. Support device according to claim 1 characterized in that the projections each incorporate a recess (26).

3. Support device according to claim 1 characterized in that the channel is U-shape in section and has a bottom wall and side walls which have a longitudinal rib on their outside face.

4. Support device according to claim 3 characterized in that the bottom wall (40) of the channel can rest on the top edges of the flanges and in that the rib can be inserted in a recess.

5. Support device according to claim 1 characterized in that the flanges have respective lateral bearing lugs adapted to bear against the top wall of the trunking to hold the support member in equilibrium in a plane perpendicular to a longitudinal axis of the trunking.

6. Support device according to claim 1 characterised in that the fastening and pivot means comprise a rivet.

* * * * *